(12) United States Patent
Paradise et al.

(10) Patent No.: US 9,349,246 B1
(45) Date of Patent: May 24, 2016

(54) INTEGRATIONS PORTAL FOR A PEER-TO-PEER GAME PLATFORM

(71) Applicant: Skillz Inc, Boston, MA (US)

(72) Inventors: Andrew Paradise, Boston, MA (US); Dennis Zografos, Somerville, MA (US)

(73) Assignee: Skillz Inc., Boston, MA (US)

(*) Notice: Subject to any disclaimer, the term of this patent is extended or adjusted under 35 U.S.C. 154(b) by 0 days.

(21) Appl. No.: 14/486,960

(22) Filed: Sep. 15, 2014

(51) Int. Cl.
*G07F 17/32* (2006.01)
*G06Q 50/34* (2012.01)
*H04L 29/08* (2006.01)

(52) U.S. Cl.
CPC ........ *G07F 17/3225* (2013.01); *G07F 17/3279* (2013.01); *G06Q 50/34* (2013.01); *G07F 17/3262* (2013.01); *G07F 17/3276* (2013.01); *G07F 17/3288* (2013.01); *H04L 67/104* (2013.01)

(58) Field of Classification Search
CPC ............ G07F 17/3288; G07F 17/3262; G07F 17/3276; G07F 17/3279; G07Q 50/34
USPC ....................................................... 463/9, 25
See application file for complete search history.

(56) References Cited

U.S. PATENT DOCUMENTS

| | | | |
|---|---|---|---|
| 6,443,841 B1 * | 9/2002 | Rossides | 463/25 |
| 6,856,986 B1 * | 2/2005 | Rossides | |
| 8,088,000 B2 * | 1/2012 | Ginsberg et al. | 463/25 |
| 8,210,926 B2 * | 7/2012 | Asher et al. | 463/25 |
| 8,313,368 B2 * | 11/2012 | Filipour et al. | 463/20 |
| 8,360,873 B1 * | 1/2013 | Wickett et al. | 463/29 |
| 8,414,387 B1 * | 4/2013 | Paradise et al. | 463/25 |
| 8,512,129 B2 * | 8/2013 | Ginsberg et al. | 463/25 |
| 8,545,330 B2 * | 10/2013 | Wickett et al. | 463/42 |
| 8,562,422 B2 * | 10/2013 | Lutnick | 463/25 |
| 8,568,222 B2 * | 10/2013 | Gagner et al. | 463/25 |
| 8,613,662 B2 * | 12/2013 | Morrow et al. | 463/29 |
| 8,641,511 B2 * | 2/2014 | Ginsberg et al. | 463/21 |
| 8,651,948 B2 * | 2/2014 | Asher et al. | 463/25 |
| 8,683,272 B2 * | 3/2014 | Cadima et al. | 714/54 |
| 8,715,077 B2 * | 5/2014 | Paradise et al. | 463/31 |
| 8,900,054 B2 * | 12/2014 | Patel | 463/29 |
| 2001/0031663 A1 * | 10/2001 | Johnson | 463/42 |
| 2002/0037767 A1 * | 3/2002 | Ebin | 463/25 |
| 2002/0073021 A1 * | 6/2002 | Ginsberg et al. | 705/38 |
| 2006/0080175 A1 * | 4/2006 | Rowe et al. | 705/14 |
| 2006/0189382 A1 * | 8/2006 | Muir et al. | 463/29 |
| 2007/0265092 A1 * | 11/2007 | Betteridge | 463/42 |
| 2008/0033734 A1 * | 2/2008 | Carry | 705/1 |

(Continued)

*Primary Examiner* — William H McCulloch, Jr.
(74) *Attorney, Agent, or Firm* — Mintz Levin Cohn Ferris Glovsky and Popeo, P.C.

(57) ABSTRACT

An integrations portal can communicate with a developer client and can include an interface to prompt the developer client for and to receive peer-to-peer competition settings and third-party game mechanics. A peer-to-peer wagering platform can be in communication with the integrations portal and a plurality of player clients and can receive data from the integrations portal that includes the peer-to-peer competition settings and the third-party game mechanics. A peer-to-peer competition can be caused to be provided to the plurality of player clients according to the peer-to-peer competition settings in which at least one of the plurality of player clients wagers on an outcome of the peer-to-peer competition. At least a part of the wager can form a reward for a winner. The outcome of the peer-to-peer competition can be determined based on a received performance and the third-party game mechanics. Related apparatus, systems, techniques, and articles are also described.

14 Claims, 18 Drawing Sheets

(56) References Cited

U.S. PATENT DOCUMENTS

| | | |
|---|---|---|
| 2008/0153588 A1* | 6/2008 | Muir et al. .................. 463/29 |
| 2008/0200242 A1* | 8/2008 | Ginsberg et al. ............ 463/25 |
| 2008/0201159 A1* | 8/2008 | Gabrick et al. ................ 705/1 |
| 2008/0234047 A1* | 9/2008 | Nguyen ....................... 463/42 |
| 2009/0197665 A1* | 8/2009 | Christensen ................. 463/20 |
| 2010/0216536 A1* | 8/2010 | Gagner et al. ............... 463/16 |
| 2010/0234101 A1* | 9/2010 | Morrow et al. .............. 463/29 |
| 2010/0241699 A1 | 9/2010 | Muthukumarasamy et al. |
| 2011/0010386 A1 | 1/2011 | Zeinfeld |
| 2011/0254223 A1* | 10/2011 | Valentine ................... 273/243 |
| 2012/0100918 A1* | 4/2012 | Ginsberg et al. ............ 463/42 |
| 2012/0156668 A1 | 6/2012 | Zelin |
| 2012/0281080 A1 | 11/2012 | Wang |
| 2013/0029760 A1* | 1/2013 | Wickett et al. .............. 463/29 |
| 2013/0079072 A1* | 3/2013 | Filipour et al. ............... 463/2 |
| 2013/0121614 A1 | 5/2013 | Intwala |
| 2013/0273987 A1* | 10/2013 | Laycock et al. .............. 463/9 |
| 2013/0331177 A1* | 12/2013 | Arnone et al. ............... 463/25 |
| 2014/0024427 A1* | 1/2014 | Cole et al. .................... 463/13 |
| 2014/0024437 A1* | 1/2014 | Vann et al. ................... 463/25 |
| 2014/0031132 A1* | 1/2014 | Wickett et al. .............. 463/42 |
| 2014/0045589 A1* | 2/2014 | Paradise et al. .............. 463/29 |
| 2014/0094267 A1* | 4/2014 | Davis et al. .................. 463/20 |
| 2014/0100023 A1* | 4/2014 | Arnone et al. ............... 463/25 |
| 2014/0128147 A1* | 5/2014 | Yu Cheng et al. ........... 463/25 |
| 2014/0194188 A1* | 7/2014 | Kosta et al. .................. 463/25 |
| 2014/0200062 A1* | 7/2014 | Paradise et al. .............. 463/16 |

* cited by examiner

INTEGRATIONS PORTAL FOR A PEER-TO-PEER GAME PLATFORM

TECHNICAL FIELD

The subject matter described herein relates to an integrations portal for a peer-to-peer game platform that can enable game developers to configure software component modules to enable peer-to-peer wagering.

BACKGROUND

Developer portals with publishing features can be used for communication with the development community. Such communication includes communicating static content, such as API documentation and terms-of-use, as well as dynamic community-contributed content such as blogs and forums. In addition, developer portals can be used to expose programming interfaces and educate developers about the programming interfaces. The web portal can also allow a developer community to provide feedback, make support and feature requests, and in some instances submit their own content that can be accessed by other developers.

SUMMARY

In an aspect, an integrations portal can include memory and one or more data processors forming part of at least one computing system. The integrations portal can be in communication with a developer client and can include an interface to prompt the developer client for and to receive peer-to-peer competition settings and third-party game mechanics. A peer-to-peer wagering platform can include memory and one or more data processors forming part of at least one computing system. The peer-to-peer wagering platform can be in communication with the integrations portal and a plurality of player clients and can be adapted to implement operations. The operations can include receiving data from the integrations portal that includes the peer-to-peer competition settings and the third-party game mechanics. The operations can include receiving data including a request from at least one of the plurality of player clients to participate in a peer-to-peer competition. The operations can include causing to be provided to the plurality of player clients the peer-to-peer competition according to the peer-to-peer competition settings specified by the developer client in which at least one of the plurality of player clients wagers on an outcome of the peer-to-peer competition. At least a part of the wager can form a reward for a winner of the peer-to-peer competition. The operations can include receiving data characterizing a performance of the plurality of player clients in the peer-to-peer competition. The operations can include determining the outcome of the peer-to-peer competition based on the received performance and the third-party game mechanics specified by the developer client. The operations can include transmitting data to initiate distribution of the reward to the winner based on the outcome.

In another aspect, data can be received from an integrations portal. The data can include peer-to-peer competition settings and third-party game mechanics. A peer-to-peer competition can be caused to be provided to a plurality of player clients according to the peer-to-peer competition settings specified by a developer client in which at least one of the plurality of player clients wagers on an outcome of the peer-to-peer competition. At least a part of the wager can form a reward for a winner of the peer-to-peer competition. The outcome of the peer-to-peer competition can be determined based on the received performance and the third-party game mechanics specified by the developer client.

One or more of the following features can be included in any feasible combination. For example, the integrations portal can prompt the developer client for and to receive a game binary executable. The game binary executable can be received from the integrations portal. A fingerprint of the game binary executable can be determined to uniquely identify the game binary executable. A player-game binary executable executing on a player client can be authorized by comparing data characterizing the player-game binary executable with the fingerprint of the game binary executable. The integrations portal can prompt the developer client for and to receive a push notification certificate. Data can be received including the push notification certificate from the integrations portal. Push notifications can be generated and transmitted to the plurality of player clients to present an advertisement on the plurality of player clients.

The peer-to-peer competition settings can enable the wager to include one of a virtual currency wager and a real-money wagering. The third-party game mechanics can include one or more rules describing how to determine the outcome of the peer-to-peer competition. The integrations portal can provide to the developer client one or more software development kits for integrating a peer-wagering module into a third-party single player game for execution on a player client. The peer-wagering module can receive a wager amount from a player associated with the player client. A data warehouse can receive one or more metrics from the peer-to-peer wagering platform characterizing player client and peer-to-peer wagering platform interactions. The integrations portal can provide data characterizing the one or more metrics to the developer client for visualization by the developer client.

Computer program products are also described that comprise non-transitory computer readable media storing instructions, which when executed by at least one data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein can provide many technical advantages. For example, in some implementations integration of software development kits can be streamlined by providing developers with software components customized for their given application. Additionally, developers can manage approval and enabling of third-party games having an integrated peer-wagering module. Furthermore, developers can manage and control configurations and settings for digital skills based gaming competition with peer-to-peer wagering. Developers can review game success, for example, by reviewing daily active users (DAU), player engagement, revenue generation, and the like within a dashboard. Security and cheating mitigation can be achieved through a binary executable fingerprinting scheme as well as enabling management of same.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter can enable game developers or game publishers to use a self-service integrations portal to configure software development kit (SDK) software component modules that can enable peer-to-peer wagering within existing single-player games. In some implementations, the integrations portal can allow game developers to download software components, can guide game developers through the process of integrating the software components into their games, can enable game developers to manage their games with respect to a peer-to-peer wagering platform, can provide statistics and other metric information about the game's player population and interactions with the peer-to-peer wagering platform, can enable the game developer to modify competitions set up through the peer-to-peer wagering platform, and can perform other configuration and setup tasks.

Figure 1:
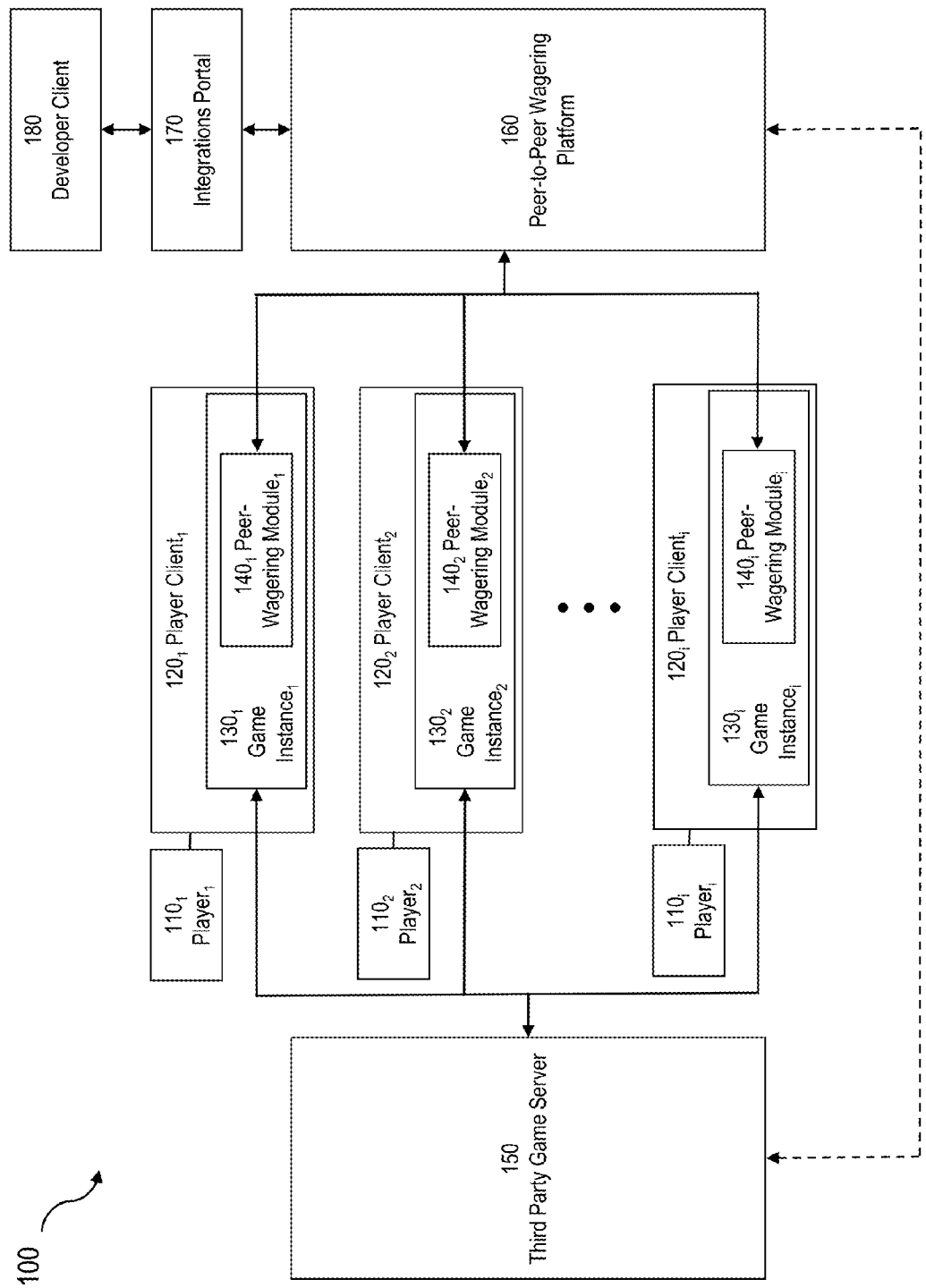
FIG. 1 is a diagram illustrating a system that facilitates a game developer in integrating peer-to-peer wagering modules within electronic games of skill and enable players to wager on the outcome of game competitions.

FIG. 1 is a system diagram illustrating a system 100 that facilitates a game developer in integrating peer-to-peer wagering modules within electronic games of skill and enable players to wager on the outcome of game competitions (such as head-to-head competitions and multiplayer tournaments). A plurality of players $110_i$ (i=1,2, . . . ,N) can operate respective player clients $120_i$. Each player client $120_i$ can include a third party game instance $130_i$. The game instance $130_i$ can include any online digital game (e.g., video game) in which player skill is the dominate factor in determining game outcome, not chance. The multiple players $110_i$ can compete against one another and/or can organize into cooperative teams. Games can be consistent across game instances $130_i$ (e.g., if the players $110_i$ are playing chess, each game instance $130_i$ is an instance of an electronic chess game). Each game instance $130_i$ can be in communication with and receiving game data from a third party game server 150. The third party game server 150 can provide game data necessary to operate the game. Alternatively or in addition, game instances $130_i$ can exchange game data directly.

In order to enable peer-to-peer wagering, developers of the game that forms each game instance $130_i$ can integrate into the game instance $130_i$ a peer-wagering module $140_i$. The peer-wagering module $140_i$ can enable the players $110_i$ to wager on the outcome of a given game competition. The peer-wagering module $140_i$ communicates with and works in tandem with a peer-to-peer wagering platform 160. The peer-to-peer wagering platform 160 can maintain account information for each player $110_i$, including financial information, and can act as a trusted party to hold funds in escrow and/or secure funds to enforce the terms of a wager (e.g., ensures winning players receive the winnings, award, reward, and the like). The peer-to-peer wagering platform 160 can also pass data characterizing advertisements (e.g., advertising logic, invitations, and/or messages) to the third party game server 150. The peer-to-peer wagering platform 160 can also include a player-matching system, and can include multiplayer features such as leaderboards, rewards, and ranking systems.

In order to enable integration of the peer-wagering module $140_i$ into the game instances $130_i$ and management of the games by the developer, the system 100 can include an integrations portal 170 in communication with the peer-to-peer wagering platform 160 and a developer client 180. The integrations portal 170 can include an interface, such as a web-portal, for prompting the game developer operating the developer client 180 for information and for receiving the information. The interface on the integrations portal 170 can enable game developers to manage their games with respect to the peer-to-peer wagering platform 160, manage competitions among the players $110_i$, and can provide statistics and other metric information about the game's player population (e.g., players $110_i$) and their interactions with the peer-to-peer wagering platform 160.

For example, developers (e.g., publishers) can sign up for an account on the integrations portal 170 using a web form interface with fields for email address, password, first name, last name, and publisher name. Similarly, developers (e.g., publishers) are able to log in with their email and password through a web form interface. Developers can be able to add additional users with discrete login and passwords to their publisher accounts, permitting multiple individuals to access a given game's account with individual credentials.

Figure 2:
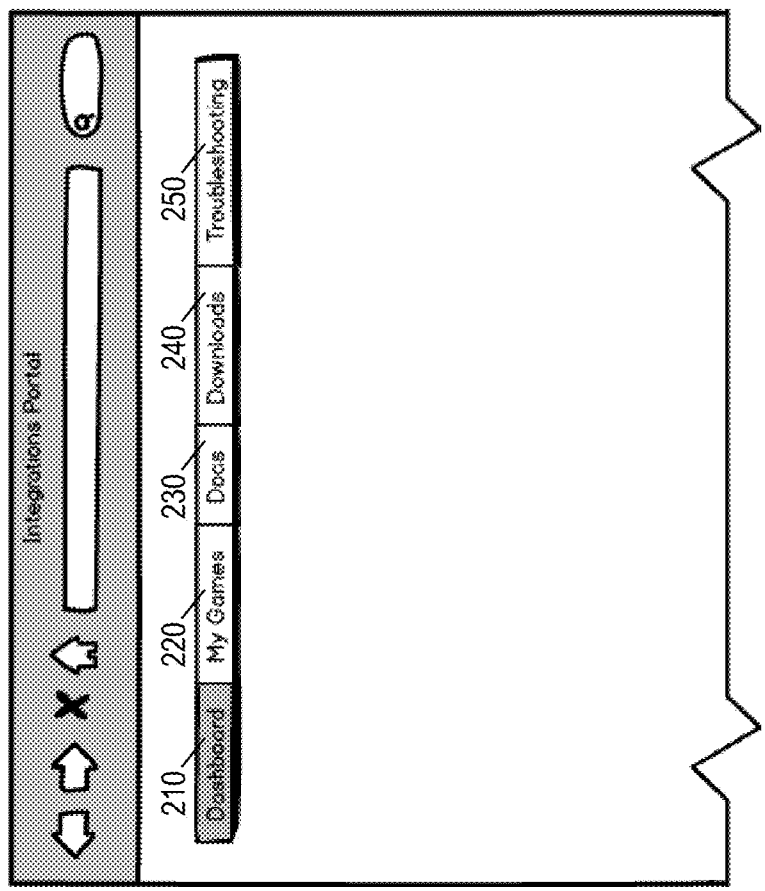
FIG. 2 is a screen shot of an example interface for the integrations portal as displayed on the developer client.

FIG. 2 is a screen shot of an example interface 200 for the integrations portal 170 as displayed on the developer client 180. The interface 200 can include links to sections for a dashboard 210, registered games 220, documentation 230, software downloads 240, and troubleshooting 250. Detailed documentation and video walkthroughs can be hosted on and accessible via the integrations portal 170 through link to documentation 230. The integrations portal 170 can provide via link to documentation 230 example projects that demonstrate the integration of the peer-wagering module 140$_i$ software components with existing third-party game software. Additionally, the integrations portal 170 can provide via link to software downloads 240 the latest version of the peer-wagering module 140$_i$ software components, tailored for consumption by the game publisher that logged in to the portal. These downloads can also be completed via a Game Setup process (via registered games 220) but can also available on the integrations portal 170 via link to software downloads 240 for convenience. A troubleshooting section can be available via troubleshooting link 250 and having a frequently asked questions (FAQ) system and a support ticketing system.

Figure 3:
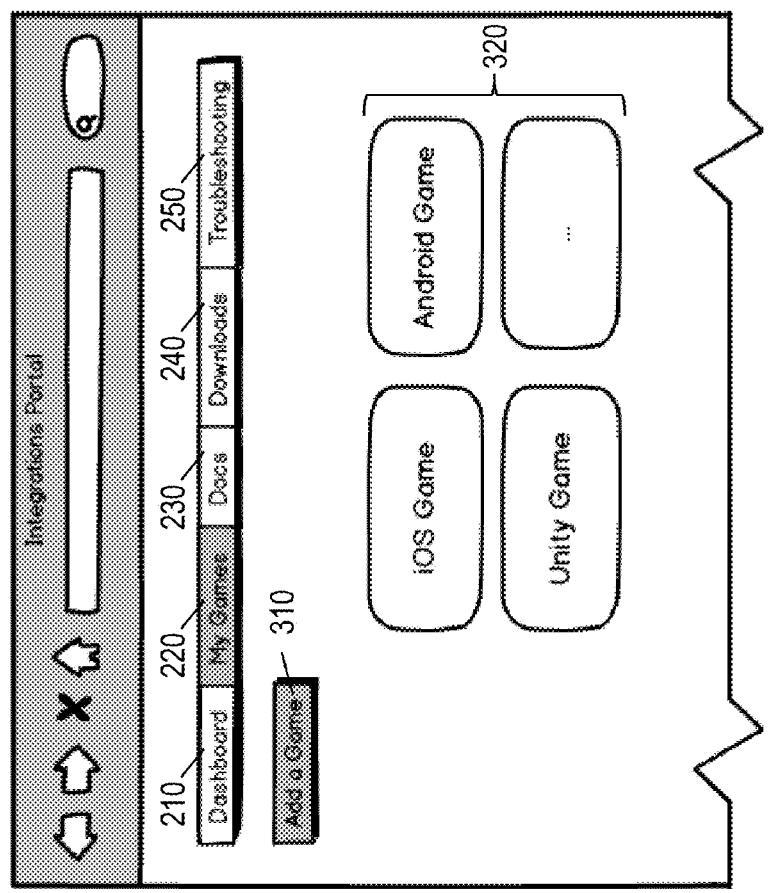
FIG. 3 is a screen shot of an example game setup interface for the integrations portal.

Using registered games 220, the integrations portal 170 can guide publishers through a process in a "wizard"-like interface with a number of consecutive and defined steps. FIG. 3 is a screen shot of an example game setup interface 300 for the integrations portal 170. When a publisher selects an "Add a Game" to the system button 310, they can be prompted with selections at 320 to select an operating system and device platform(s) that their game is available on. The selected operating system and device platform(s) can affect the rest of the integrations guide such that the rest of the integrations guide can be tailored towards the selected operating system and device platform(s).

Figure 4:
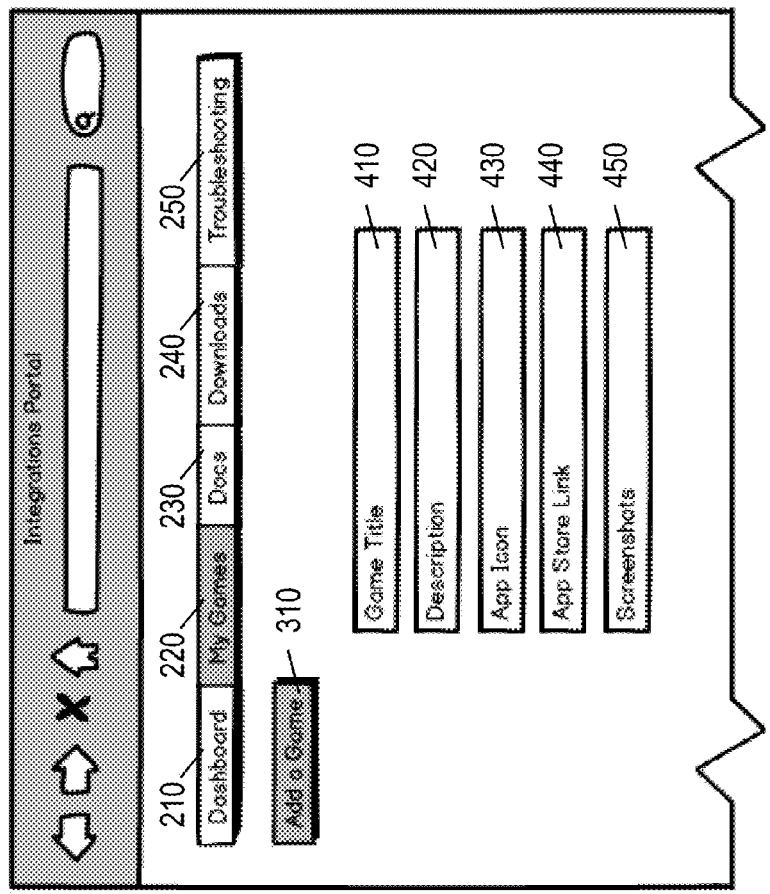
FIG. 4 is a screen shot of an example basic game information interface 400 for prompting for basic game information.

FIG. 4 is a screen shot of an example basic game information interface 400 for prompting for basic game information. The integrations portal 170 can prompt the game publisher for details regarding their game. Examples of game detail prompts can include title 410, description 420, application icon image(s) 430, links to existing application store entries 440, screenshots of the game 450 and other such relevant information. The peer-to-peer wagering platform 160 can use the entered details for promotion, such as publishing the application in application stores and running advertising campaigns.

Figure 5:
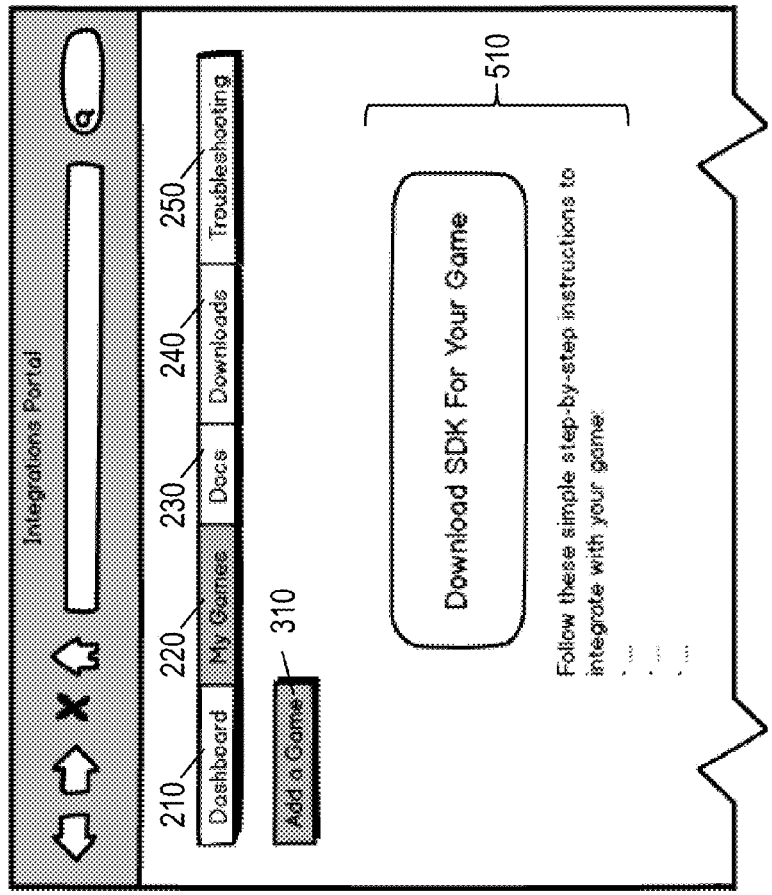
FIG. 5 is a screen shot of an example software download interface for prompting a developer to download an SDK.

FIG. 5 is a screen shot of an example software download interface 500 for prompting a developer to download an SDK. The integrations portal 170 can prompt the game publisher to download software modules (such as software development kits) using a download prompt 510 and can guide the game publisher through the process of hooking it (e.g., integrating) into their game's software code. The downloadable SDK can be custom tailored towards their particular game based on the parameters already entered by the publisher. For example, the latest version of the peer-wagering module 140$_i$ software components can be tailored for consumption by the game publisher that logged in to the portal by pre-configured interaction with peer-to-peer wagering platform 160 for the particular game (e.g., no need for manual configuration of keys or identifiers). Custom tailoring can include appropriate software for the game's platform (e.g., target devices, operating system type, version, and the like); aesthetic design of interface components that can complement the specific game; the software components can be configured for analytics on usage and ad-based user acquisition; and software components can be tailored for the type of multiplayer experience (e.g., turn-based vs single-round, asynchronous vs synchronous, head-to-head vs many-player entry for "grand prizes", and the like).

Figure 6:
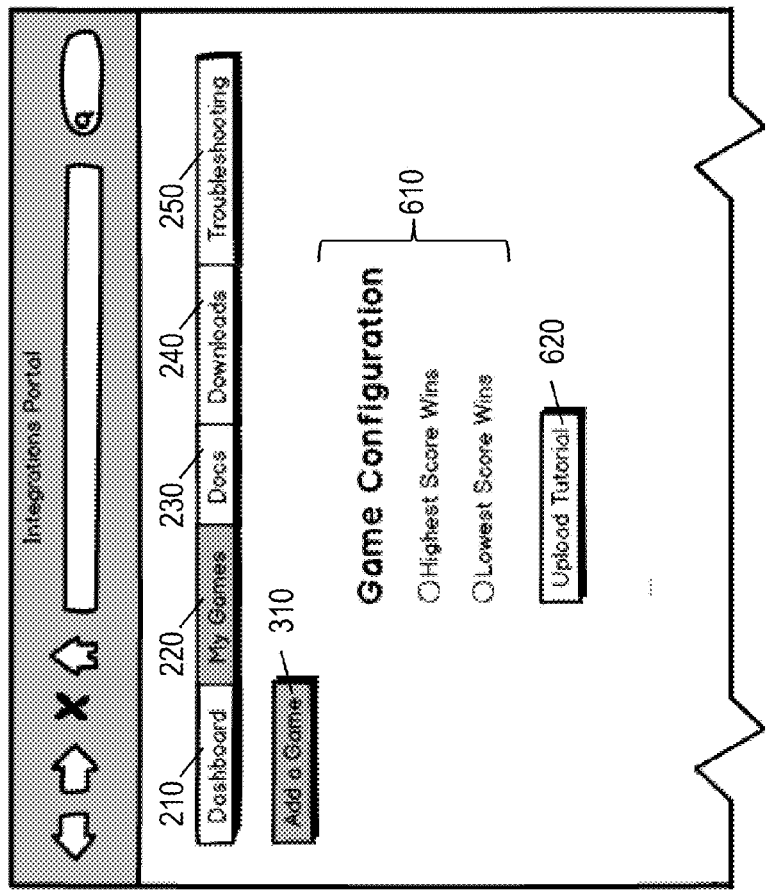
FIG. 6 is a screen shot of an example game configuration interface for prompting a developer to supply information related to game mechanics.

FIG. 6 is a screen shot of an example game configuration interface 600 for prompting a developer to supply information related to game mechanics. The integrations portal 170 can prompt the game publisher for the basic rules of their game via game configuration prompt 610. Examples of such game rules can include how the game is scored (e.g. whether lowest or highest score wins), how rounds are played, tutorial instructions and images for new users, and other relevant scoring metrics and metadata. Game mechanics can come in the form of rule sets. For example, a rule in the rule set can include "maximum score wins." The integrations portal 170 can also prompt the developer for a game tutorial via upload tutorial prompt 620. By providing the game mechanics information and a game tutorial to the integrations portal 170, which can then transmit the information to the peer-to-peer wagering platform 160, the publisher can enable the peer-to-peer wagering platform 160 to perform operations such as correctly determining game outcomes, matching up players based upon relative skill, and automatically presenting tutorials and rule lists to new players.

Figure 7:
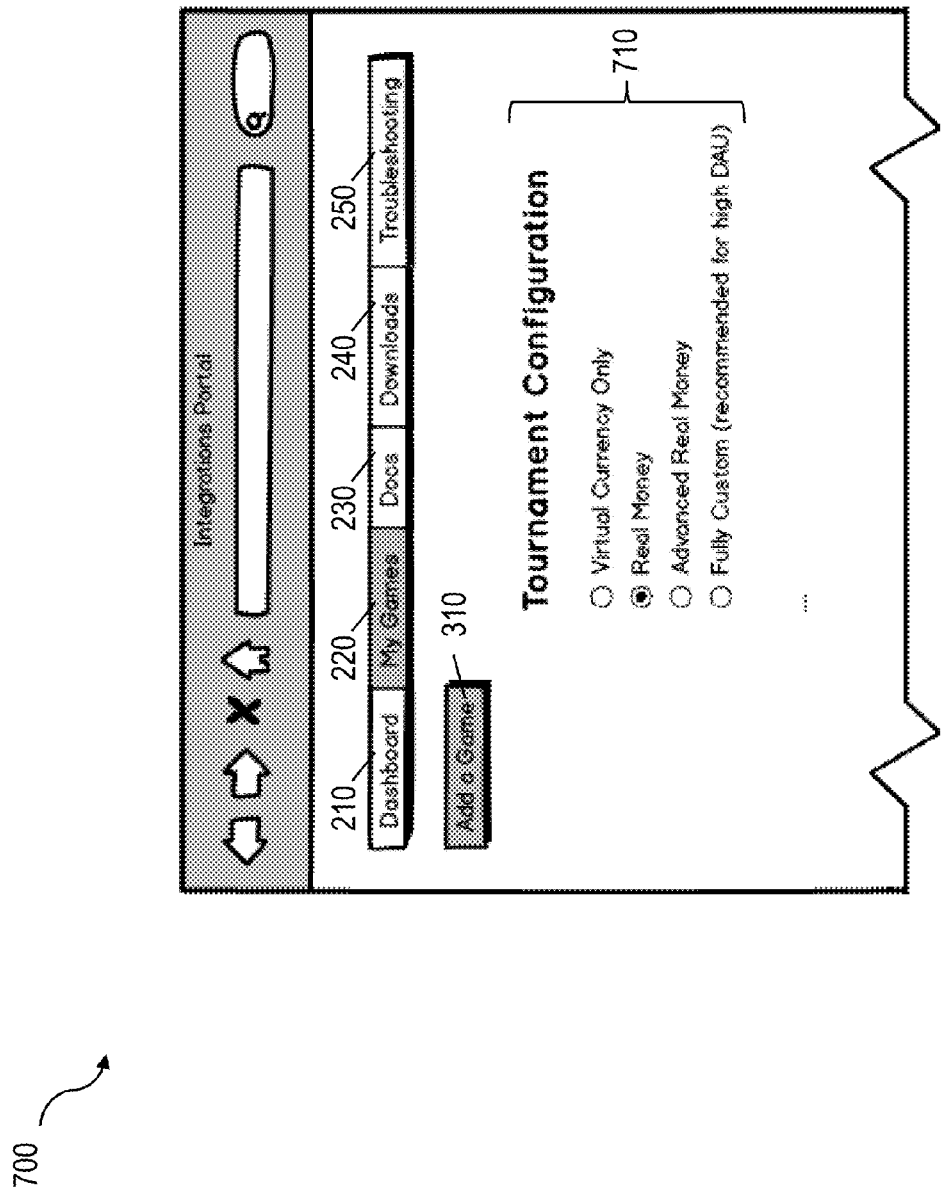
FIG. 7 is a screen shot of an example competition configuration interface for prompting a developer to supply or customize peer-to-peer platform settings or parameters for their game.

FIG. 7 is a screen shot of an example competition configuration interface 700 for prompting a developer to supply or customize peer-to-peer wagering platform 160 settings or parameters for their game. The developer can configure peer-to-peer competition settings via competition configuration prompt 710. The peer-to-peer competition settings can be predetermined and can include features such as virtual currency games, real money tournaments, leaderboards, reward systems, instant replay, and other like features.

Figure 8:
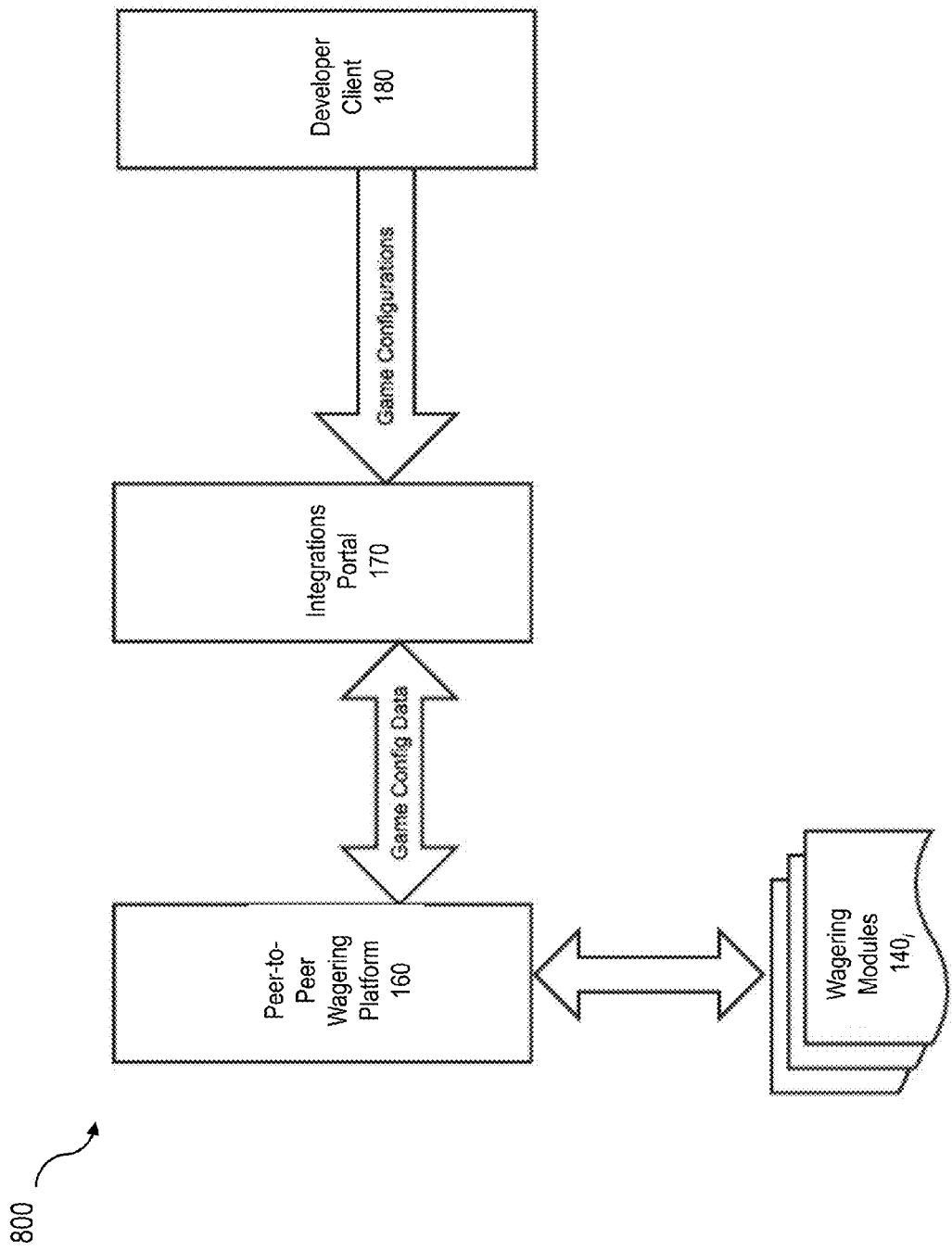
FIG. 8 is a data flow block diagram illustrating an example flow of configuration data between the developer client, the integrations portal, the peer-to-peer wagering platform and the player clients.

FIG. 8 is a data flow block diagram 800 illustrating an example flow of configuration data between the developer client 180, the integrations portal 170, the peer-to-peer wagering platform 160 and the player clients 120$_i$. The integrations portal 170 can prompt the developer client 180 for and can receive from the developer client 180 game configuration data such as game mechanics, game tutorials, and peer-to-peer competition settings. The integrations portal 170 can be in communications with the peer-to-peer wagering platform 160 and can transmit the game configuration data (and/or a characterization of the game configuration data) to the peer-to-peer wagering platform 160. Using the game configuration data, the peer-to-peer wagering platform 160 can operate in tandem with the peer-wagering modules 140$_i$ to enable wagering on electronic games of skill including determining game outcomes, matching up players based upon relative skill, and automatically presenting tutorials and rule lists to new players.

Figure 9:
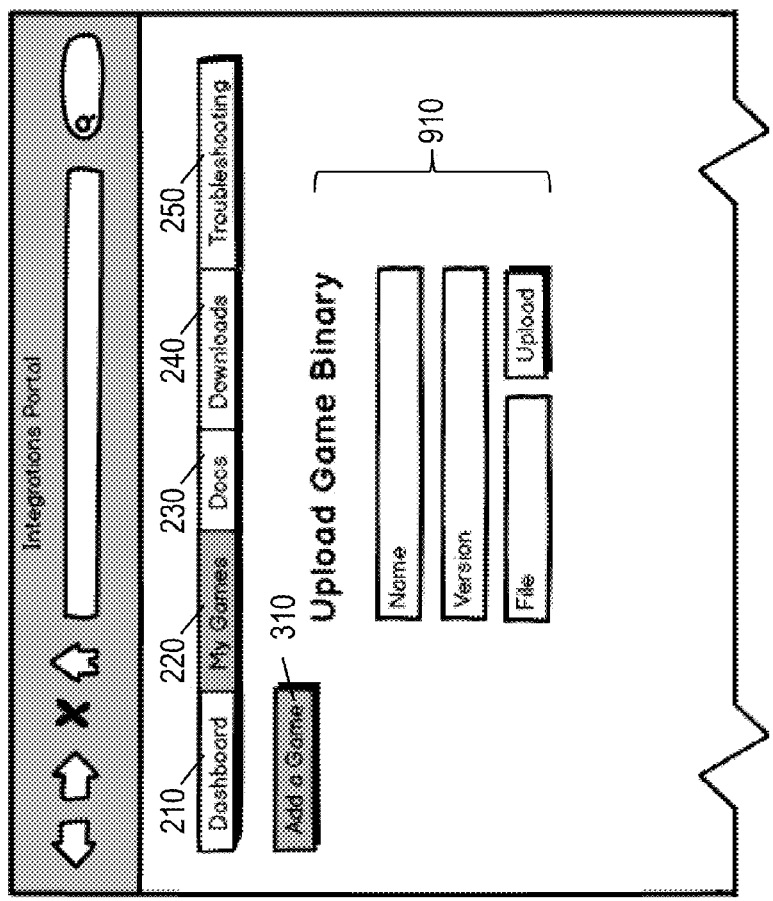
FIG. 9 is a screen shot of an example game binary upload interface for prompting the developer to upload a binary executable of their game.

FIG. 9 is a screen shot of an example game binary upload interface 900 for prompting the developer to upload a binary executable of their game. The developer can upload a binary executable of their game with integrated peer-to-peer wagering software modules (for example, the modules downloaded using software download interface 500 and download prompt 510) via upload binary prompt 910. Using the uploaded binary executables, the peer-to-peer wagering platform 160 can uniquely fingerprint, track, activate, enable and disable individual game binaries as part of integration and as a security measure.

Fingerprinting can accomplished by inserting a unique ID into the game binary at build time that is readable by both the running application and by the integrations portal 170 (upon uploading). This fingerprint can uniquely identify individual builds (or "binaries") of games. A modification of the game binary (e.g., a new version) from the game developer will cause a change in fingerprint, as will unauthorized modifications (e.g., hacks). This allows the prevention of unauthorized game binaries from performing operations on the peer-to-peer wagering platform 160. It also allows for the prevention of players $110_i$ being matched up and playing across incongruent versions of the game with different rules. This also allows individual game builds to be tracked, which can be useful in tracking down software defects and disabling specific buggy versions (for example, disabling a certain version of game software that is able to be exploited to gain unfair advantage). Fingerprinting can also allow for adding support for new game modes in specific versions of the game only, thereby facilitating the ability for the game publisher to introduce a new 'level' or style of gameplay that only users of a new version can play, without freezing out users of the old version.

In some implementations, the peer-to-peer wagering platform 160 can serve the uploaded executable binaries to players $110_i$ (e.g., end-users) through an application store.

Figure 10:
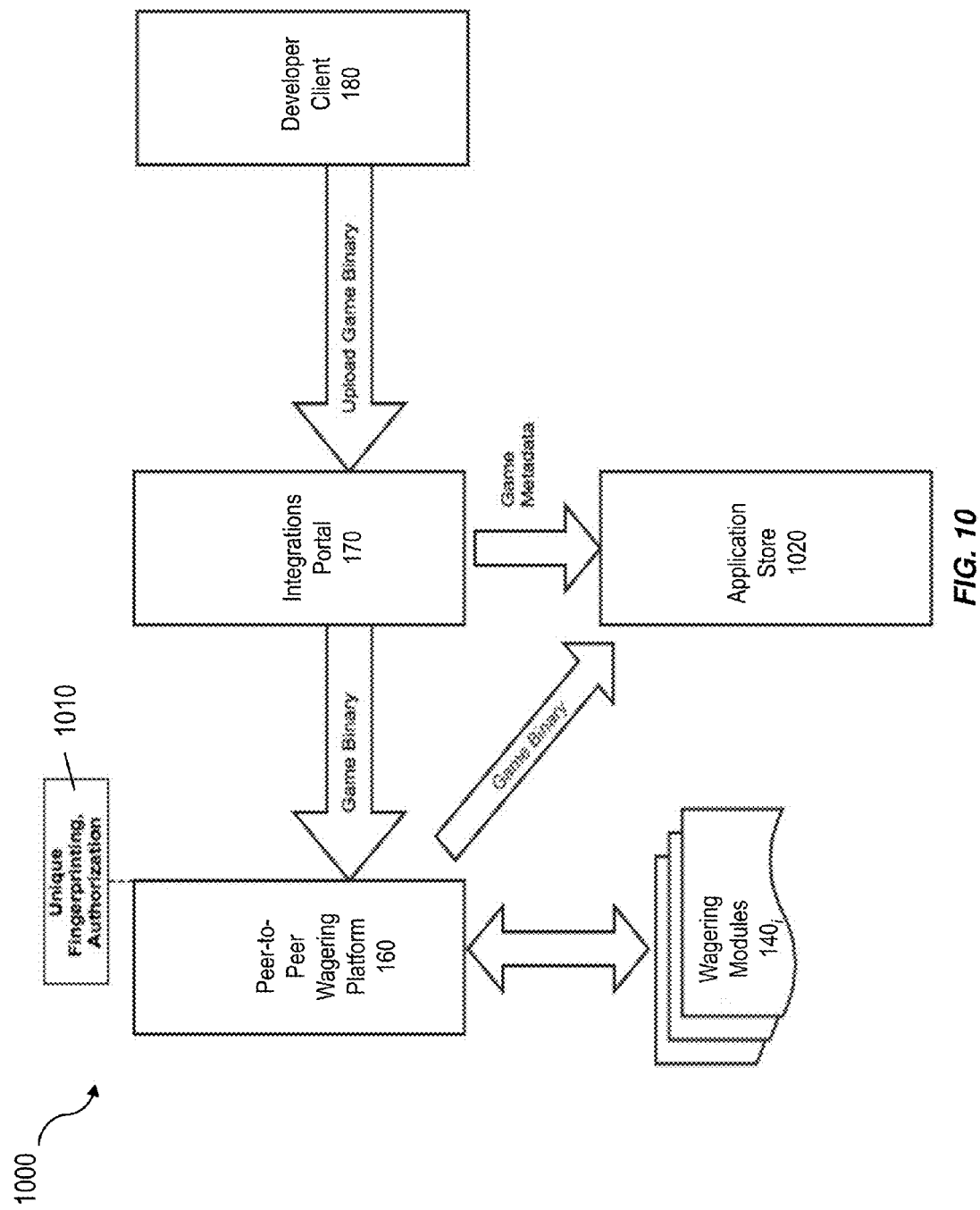
FIG. 10 is a data flow block diagram illustrating an example flow of game executable binaries between the developer client, the integrations portal, the peer-to-peer wagering platform, and the player clients.

FIG. 10 is a data flow block diagram 1000 illustrating an example flow of game executable binaries between the developer client 180, the integrations portal 170, the peer-to-peer wagering platform 160 and the player clients $120_i$. The integrations portal 170 can prompt the developer client 180 for and can receive from the developer client 180 executable binaries for the developer game. The integrations portal 170 can be in communications with the peer-to-peer wagering platform 160 and can transmit the game executable binaries (and/or a characterization of the game executable binaries) to the peer-to-peer wagering platform 160. Using the game executable binaries, the peer-to-peer wagering platform 160 can fingerprint, track, and enable a given version of the game executable binaries using, for example, a fingerprinting and authorization module 1010.

The integrations portal 170 and/or the peer-to-peer wagering platform 160 can transmit the game executable binaries to an application store 1020 for distribution to players $110_i$. The integrations portal 170 can transmit to the application store 1020 game details or meta data (for example, information prompted for by the example basic game information interface 400) for promotional or other use by the application store 1020. Additionally, the peer-to-peer wagering platform 160 can operate in tandem with the peer-wagering modules $140_i$ to enable wagering on electronic games of skill including authorizing game instances $130_i$ by comparing the game instance $130_i$ to the binary executable fingerprint.

Figure 11:
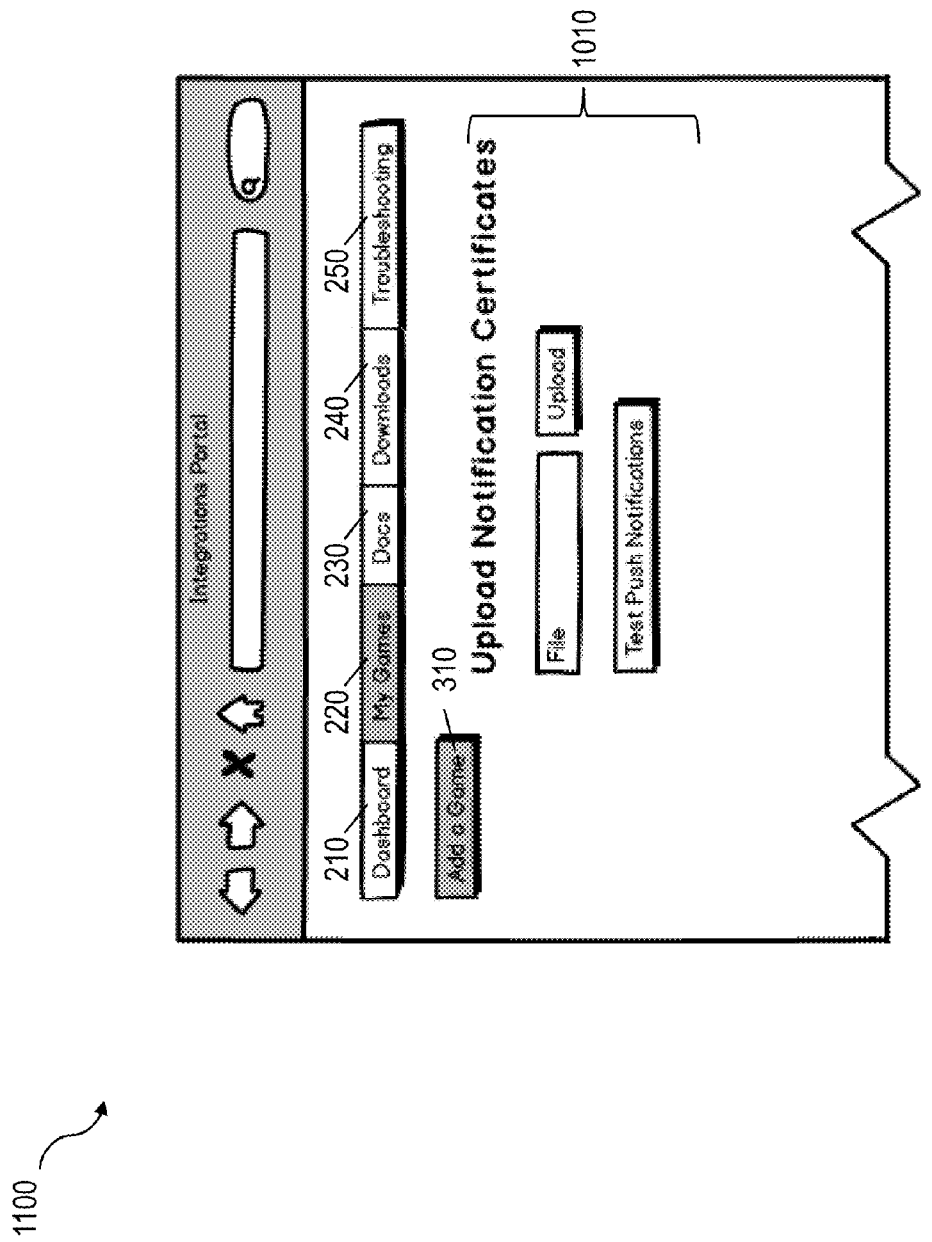
FIG. 11 is a screen shot of an example notification certificates upload interface for prompting the developer to upload a notification certificate for use with the game.

FIG. 11 is a screen shot of an example notification certificates upload interface 1100 for prompting the developer to upload a notification certificate for use with the game. The integrations portal 170 can prompt the developer for a notification certificate, which the peer-to-peer wagering platform 160 may need to send push notifications to the players $110_i$ through the game instance $130_i$ (e.g., publisher's game application). The developer can also interactively test if push notifications are working. Push notifications can be used by the peer-to-peer wagering platform 160 to inform players $110_i$ of activity that occurred while they were away (e.g., they won, they lost, it's their turn to play, a leaderboard has ended, they have received a special bonus award, and the like). Push notifications can also be used for re-engagement and advertisement, e.g., to entice players $110_i$ to return to the game or to notify players $110_i$ of an upcoming game event. The interactive testing performed via the integrations portal 170 can confirm that the push notification service is working correctly.

Figure 12:
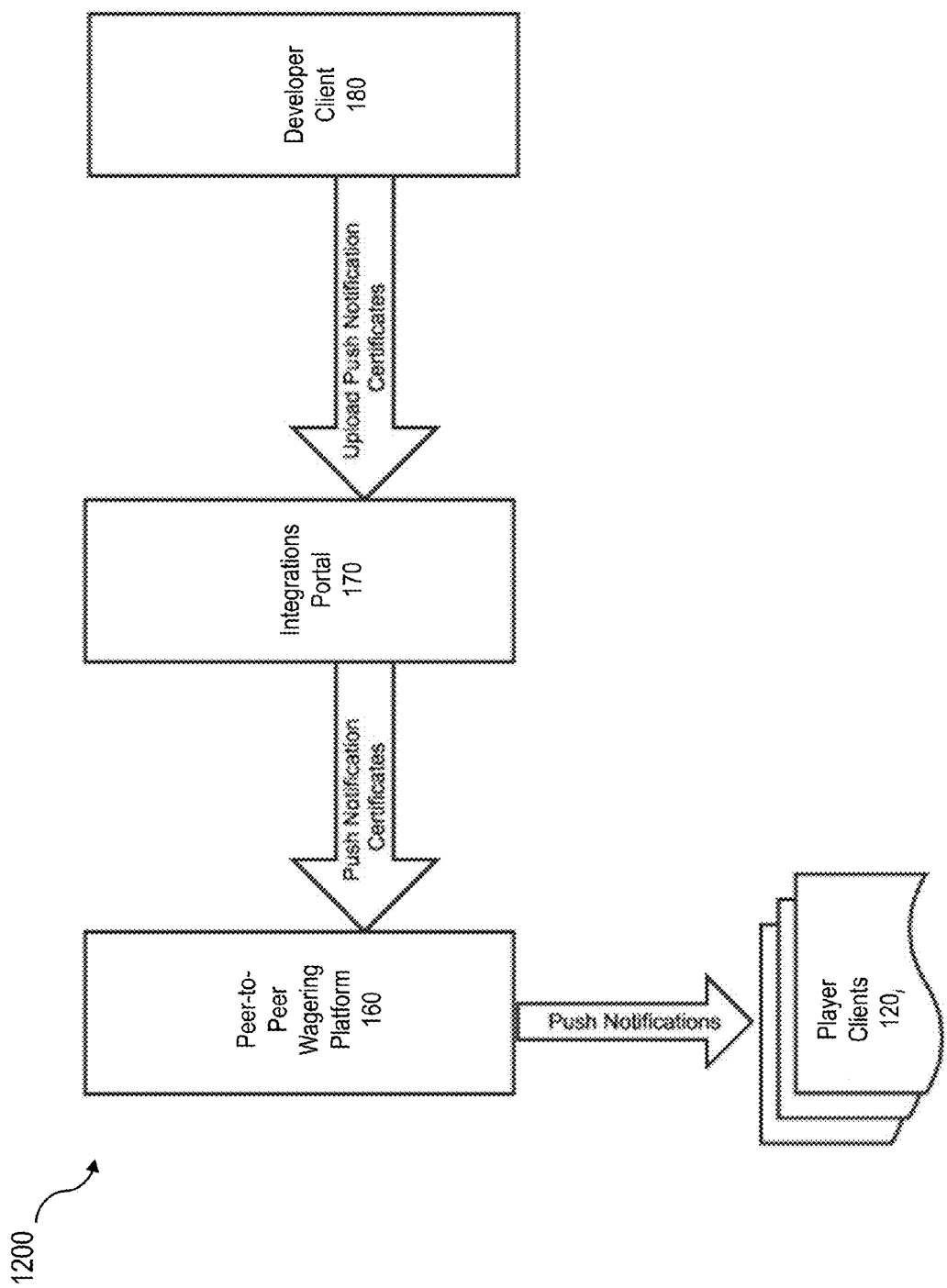
FIG. 12 is a data flow block diagram illustrating an example flow of push notification certificates and push notifications between the developer client, the integrations portal, the peer-to-peer wagering platform, and the player clients.

FIG. 12 is a data flow block diagram 1200 illustrating an example flow of push notification certificates and push notifications between the developer client 180, the integrations portal 170, the peer-to-peer wagering platform 160 and the player clients $120_i$. The integrations portal 170 can prompt the developer client 180 for and can receive from the developer client 180 push notification certificates for the developer game. The integrations portal 170 can be in communications with the peer-to-peer wagering platform 160 and can transmit the push notification certificates (and/or a characterization of the push notification certificates) to the peer-to-peer wagering platform 160. Using the push notification certificates, the peer-to-peer wagering platform 160 can transmit push notifications to the player clients $120_i$ for game or wager related functionality.

Figure 13:
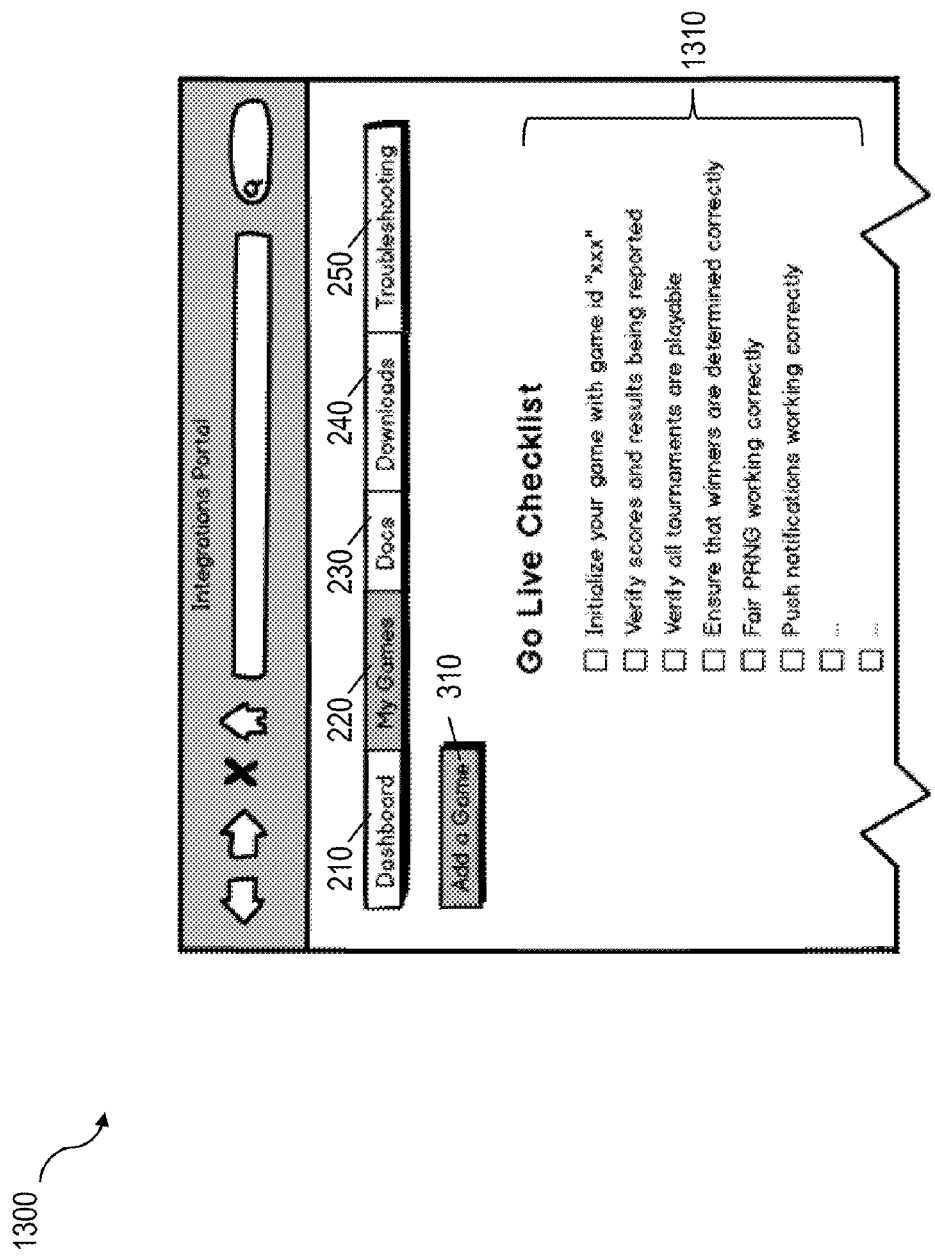
FIG. 13 is a screen shot of an example checklist interface for prompting the developer with a list of steps required before game integration and setup is complete.

FIG. 13 is a screen shot of an example checklist interface 1300 for prompting the developer with a list of steps required before game integration and setup is complete. The integrations portal 170 can prompt the developer with a list 1310 of all the steps they have needed to take before their game integration and setup is complete and ready for production use with the peer-to-peer wagering platform 160. In some implementations, publishers will have completed this list by the time integrations portal 170 presents the checklist interface 1300. This checklist can serve as a final reminder.

Figure 14:
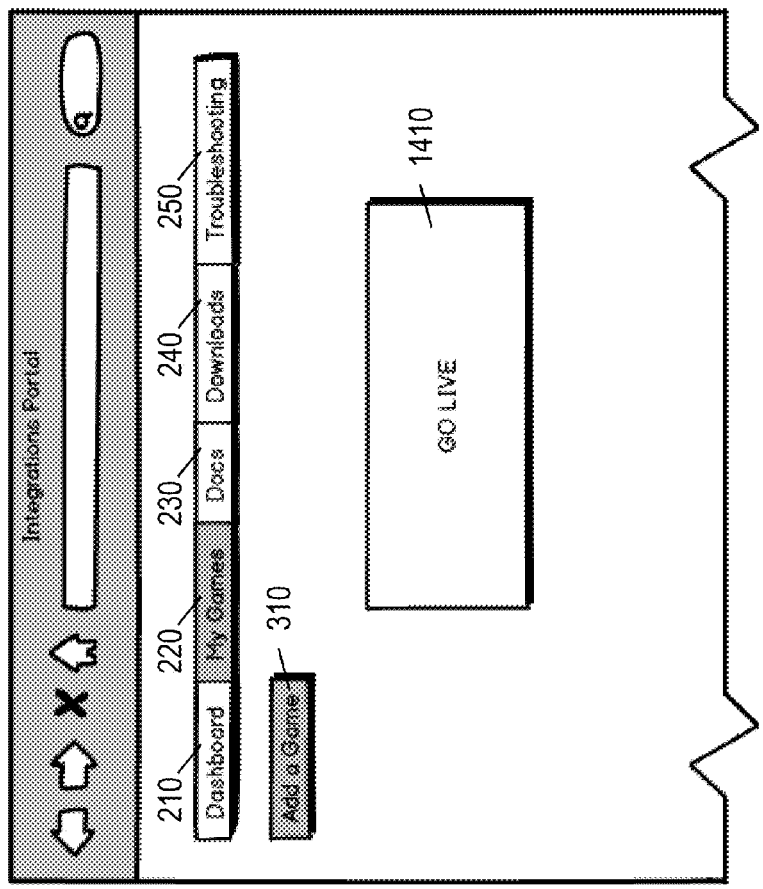
FIG. 14 is a screen shot of an example go live interface for prompting the developer to enable peer-to-peer wagering with their game once game integration and setup is complete.

FIG. 14 is a screen shot of an example go live interface 1400 for prompting the developer to enable peer-to-peer wagering with their game once game integration and setup is complete. The integrations portal 170 can prompt the developers with an enable prompt 1410 to "go live." Once the game and peer-to-peer wagering platform 160 is enabled, peer-to-peer wagering by players $110_i$ may proceed.

Figure 15:
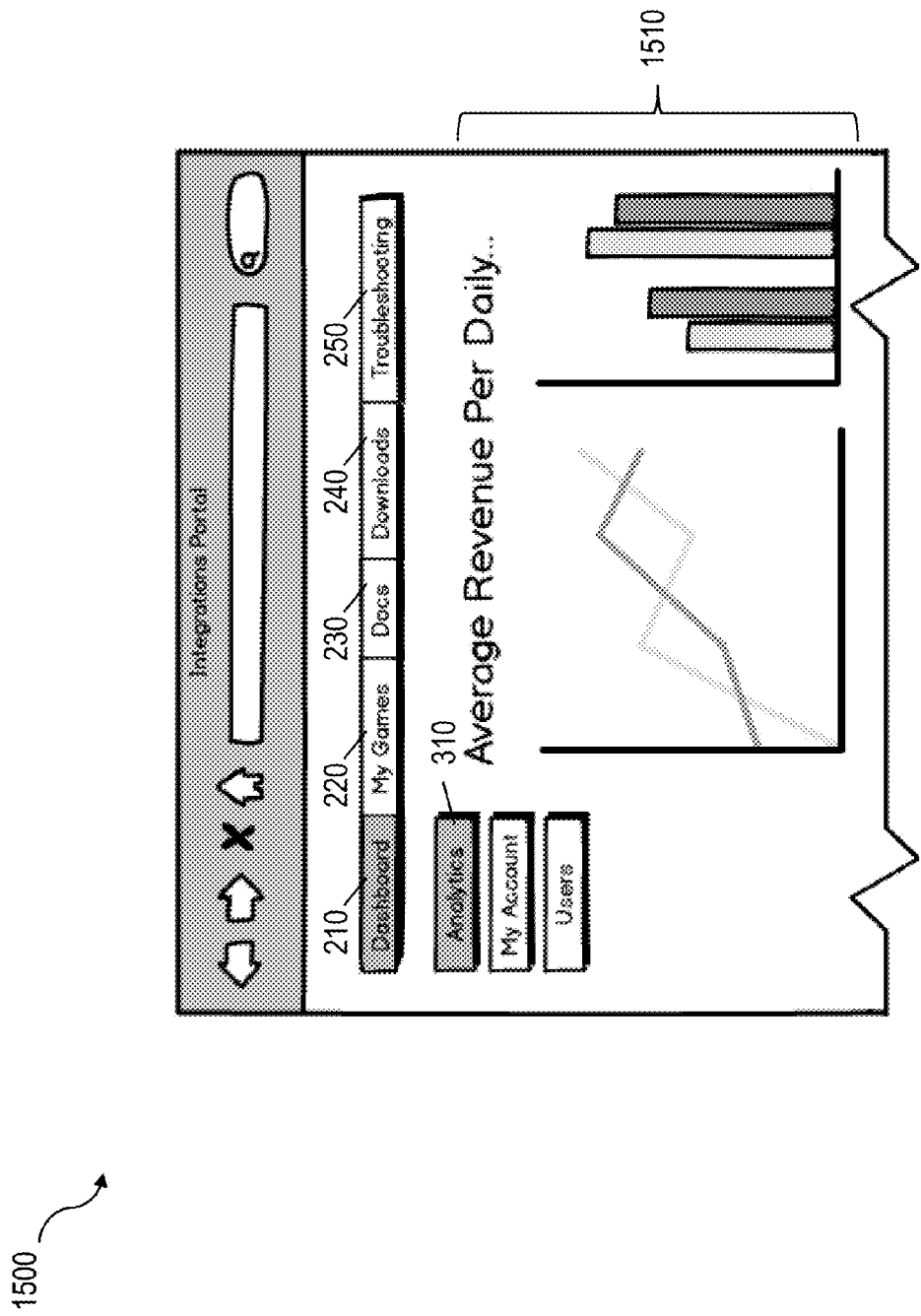
FIG. 15 is a screen shot of an example analytics interface for presenting historical statistics and metrics related to their game and interactions between their game and players.

FIG. 15 is a screen shot of an example analytics interface 1500 for presenting historical statistics and metrics related to their game and interactions between their game and players $110_i$. The integrations portal 170 can present the developers with a statistics prompt 1510. The statistics and metrics can be displayed in tables and/or visual format (e.g., graphs, charts, and the like). Both to current and historical data can be provided. The statistics can include daily active users (DAU), number of games played, average revenue per daily active user (ARPDAU), net revenue, average scores, win rate distribution, and other information relevant to the game publisher, the game, and player interaction with the game.

Figure 16:
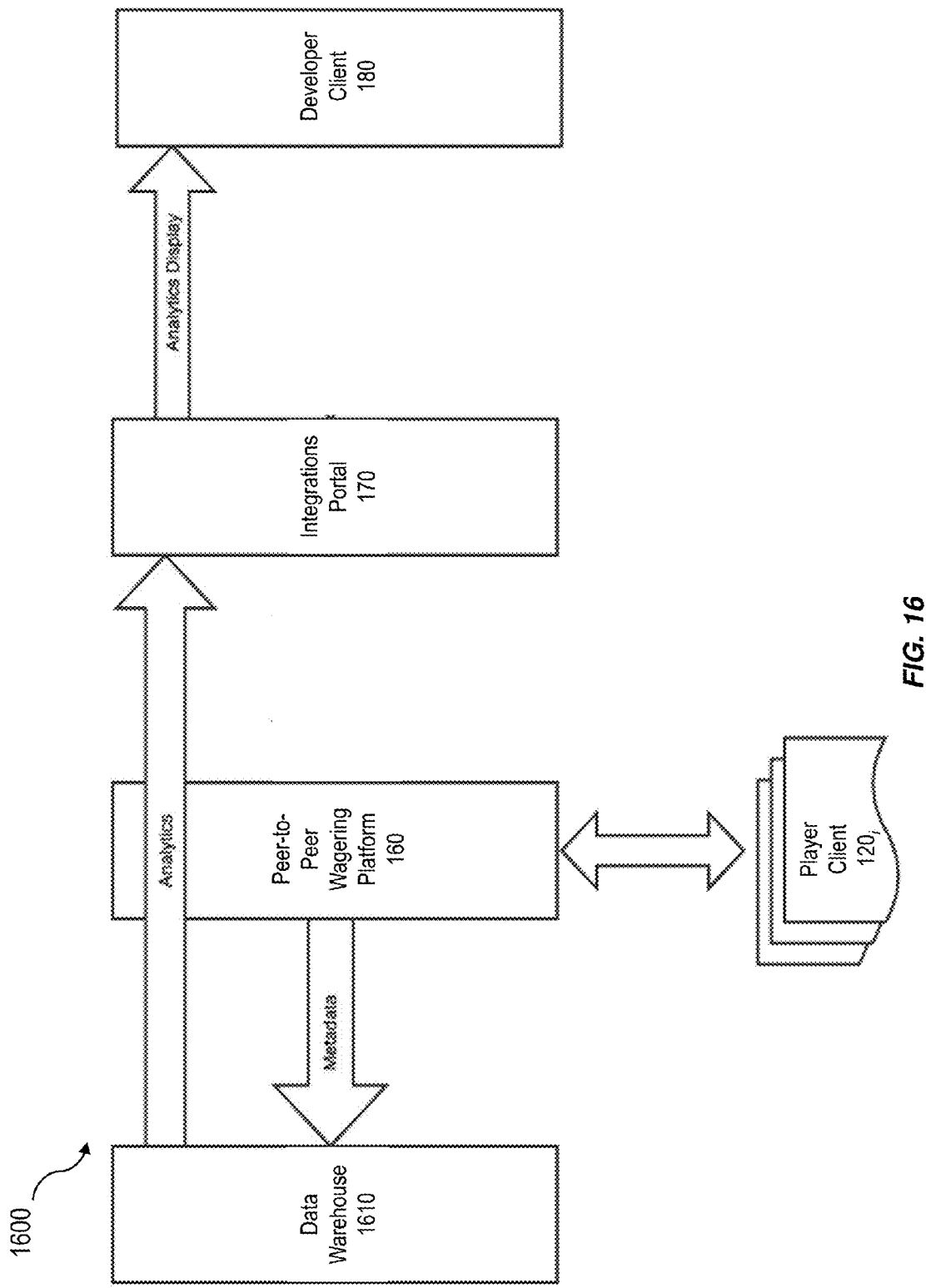
FIG. 16 is a data flow block diagram illustrating an example flow of analytic data between the developer client, the integrations portal, the peer-to-peer wagering platform, and the player clients.

FIG. 16 is a data flow block diagram 1600 illustrating an example flow of analytic data between the developer client 180, the integrations portal 170, the peer-to-peer wagering platform 160 and the player clients $120_i$. Peer-to-peer wagering platform 160 can collect analytics information (such as competition metadata) and store the collected data in a data warehouse 1610. The data warehouse 1610 can aggregate the analytics data and integrations portal 170 can present the analytics data to the developer client 180 for display. The analytics data or information can enable a developer to manage and assess the success and/or revenue of their game.

Figure 17:
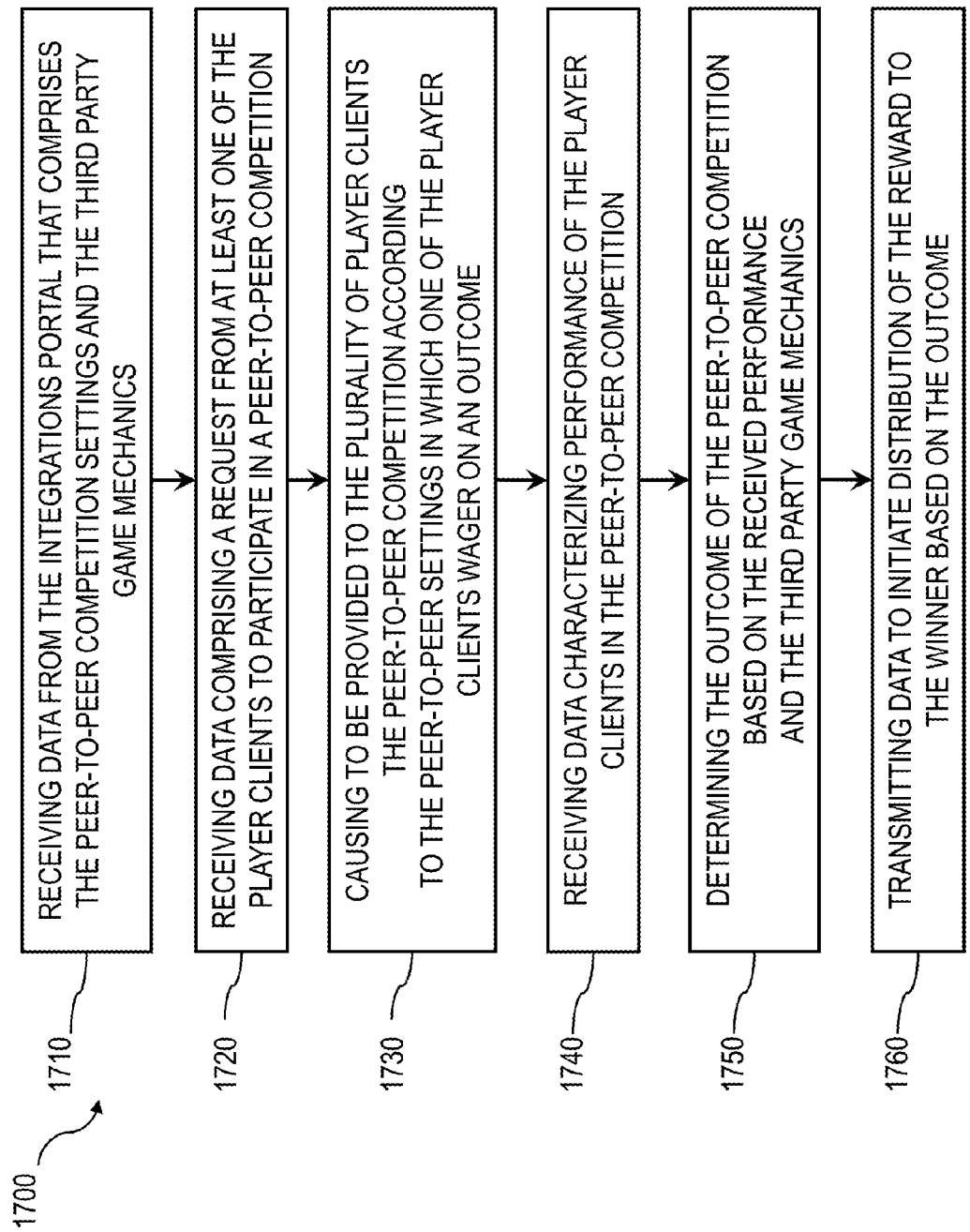
FIG. 17 is a process flow diagram illustrating a process that can enable a developer to add or modify competition settings and third-party game mechanics for a platform providing a digital game competition with peer-to-peer wagering.

FIG. 17 is a process flow diagram illustrating a process 1700 that can enable a developer to add or modify competition settings and third-party game mechanics for a platform providing a digital game competition with peer-to-peer wagering. A peer-to-peer wagering platform 160 can receive, at 1710, the peer-to-peer competition settings and the third-party game mechanics from the integrations portal 170. The integrations portal 170 can have prompted the developer client 180 for and received the peer-to-peer competition settings and the third party game-mechanics. The peer-to-peer competition settings can include, for example, whether the competition can be for virtual or real money. Other settings can be specified. The third party game mechanics can include one or more rules defining how to determine the outcome of a competition (e.g., determine the game winner).

The peer-to-peer wagering platform 160 can receive, at 1720, a request from at least one of the player clients $120_i$ to participate in a peer-to-peer competition. The player clients $120_i$ can include game instances $130_i$ having integrated peer-wagering modules $140_i$.

The peer-to-peer wagering platform 160 can cause to be provided to the player clients $120_i$, at 1730, the peer-to-peer competition according to the peer-to-peer competition settings specified by the developer client 180. At least one of the player clients $120_i$ can wager on an outcome of the peer-to-peer competition and in some implementations, at least a part of the wager forms a reward for the winner of the peer-to-peer competition.

The gaming competition can proceed under normal game operation and once the game competition completes, at 1740, the peer-to-peer wagering platform 160 can receive a characterization of the performance of the players $110_i$ operating the player clients $120_i$. For example, the numerical score of each player client $120_i$ can be received.

The peer-to-peer wagering platform 160 can determine, at 1750, the outcome of the peer-to-peer competition based on the received performance and the game mechanics. For example, if the received performance characterizes each participating player's score and the third-party game mechanics require the lowest score to win (e.g., such as in golf), the outcome can be determined to be the lowest score.

The peer-to-peer wagering platform 160 can transmit, at 1760, data to initiate distribution of the reward to the winner based on the outcome. For example, funds can be distributed to accounts associated with the winner.

Figure 18:
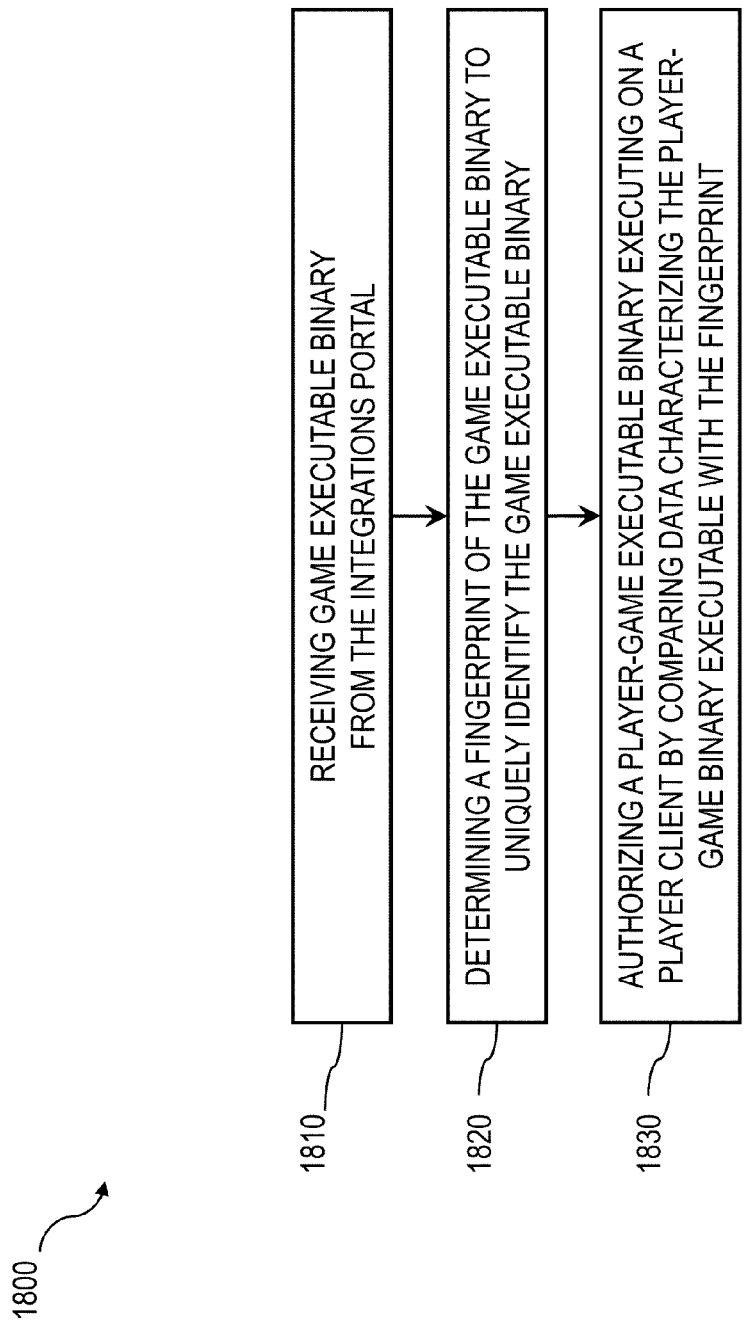
FIG. 18 is a process flow diagram illustrating a process of authorizing a game binary operating on a player client.

FIG. 18 is a process flow diagram illustrating a process 1800 of authorizing a game binary operating on a player client $120_i$ as the game instance $130_i$. The peer-to-peer wagering platform 160 can, at 1810, receive a game executable binary from the integrations portal 170. The integrations portal 170 can have prompted the developer client 180 for and received the game executable binary. A fingerprint of the game executable binary can, at 1820, be determined that identifies the game executable binary. In some implementations, the game executable binary is uniquely identified. The peer-to-peer wagering platform 160 can authorize, at 1830, player-game executable binaries that are executing on player clients $120_i$. The authorization can occur by comparing data characterizing the player-game executable binary with the fingerprint. If the binaries match, then the authorization can occur.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the implementations described above can be directed to various combinations and subcombinations of the disclosed features and/or combinations and subcombinations of several further features disclosed above. In addition, the logic flows depicted in the accompanying figures and described herein do not require the particular order shown, or sequential order, to achieve desirable results. Other embodiments may be within the scope of the following claims.

What is claimed is:

1. A system comprising:
   an integrations portal comprising memory and one or more data processors forming part of at least one computing system, the integrations portal in communication with a developer client, remote from a third party game server providing game data for operation of a game, and including an interface to prompt the developer client for and to receive peer-to-peer competition settings and third-party game mechanics, the third-party game mechanics comprising a rule set defining how to determine the outcome of a peer-to-peer competition; and a peer-to-peer wagering platform comprising memory and one or more data processors forming part of at least one computing system, the peer-to-peer wagering platform in communication with the integrations portal and a plurality of player clients and adapted to implement operations comprising:
- receiving data comprising the game binary executable from the integrations portal;
- determining a fingerprint of the game binary executable to uniquely identify the game binary executable;
- comparing data characterizing the plurality of player-game binary executables with the fingerprint of the game binary executable;
- preventing player clients from competing across incongruent versions of the game with different third-party game mechanics by authorizing, based on the comparing, a plurality of player-game binary executables executing on respective player clients;
- receiving data from the integrations portal that comprises the peer-to-peer competition settings and the third-party game mechanics;
- receiving data comprising a request from at least one of the plurality of player clients to participate in the peer-to-peer competition;
- causing to be provided to the plurality of player clients the peer-to-peer competition according to the peer-to-peer competition settings specified by the developer client in which at least one of the plurality of player clients wagers on an outcome of the peer-to-peer competition, wherein at least a part of the wager forms a reward for a winner of the peer-to-peer competition;
- receiving data characterizing a performance of the plurality of player clients in the peer-to-peer competition;
- determining the outcome of the peer-to-peer competition based on the received performance and the third-party game mechanics specified by the developer client; and
- transmitting data to initiate distribution of the reward to the winner based on the outcome.

2. The system of claim 1, wherein the integrations portal is further adapted to prompt the developer client for and to receive a push notification certificate; and
wherein the operations further comprise:
- receiving data comprising the push notification certificate from the integrations portal;
- generating and transmitting push notifications to the plurality of player clients to present an advertisement on the plurality of player clients.

3. The system of claim 1, wherein the peer-to-peer competition settings enable the wager to include one of a virtual currency wager and a real-money wagering.

4. The system of claim 1, wherein the integrations portal is further adapted to provide to the developer client one or more software development kits for integrating a peer-wagering module into a third-party single player game for execution on a player client, the peer-wagering module adapted to receive a wager amount from a player associated with the player client.

5. The system of claim 1, further comprising a data warehouse adapted to receive one or more metrics from the peer-to-peer wagering platform characterizing player client and peer-to-peer wagering platform interactions; and
wherein the integrations portal is further adapted to provide data characterizing the one or more metrics to the developer client for visualization by the developer client.

6. A method for implementation using an integrations portal and a peer-to-peer wagering platform, the integrations portal comprising one or more data processors forming part of at least one computing system, the integrations portal in communication with a developer client, remote from a third party game server providing game data for operation of a game, and including an interface to prompt the developer client for and to receive peer-to-peer competition settings and third-party game mechanics, the third-party game mechanics comprising a rule set defining how to determine the outcome of a peer-to-peer competition, the peer-to-peer wagering platform comprising one or more data processors forming part of at least one computing system, the peer-to-peer wagering platform in communication with the integrations portal and a plurality of player clients, the method comprising:
- receiving data comprising the game binary executable from the integrations portal;
- determining a fingerprint of the game binary executable to uniquely identify the game binary executable;
- authorizing a plurality of player-game binary executables executing on respective player clients by comparing data characterizing the plurality of player-game binary executables with the fingerprint of the game binary executable to prevent player clients from competing across incongruent versions of the game with different third-party game mechanics;
- receiving data from the integrations portal that comprises the peer-to-peer competition settings and the third-party game mechanics;
- receiving data comprising a request from at least one of the plurality of player clients to participate in a peer-to-peer competition;
- causing to be provided to the plurality of player clients the peer-to-peer competition according to the peer-to-peer competition settings specified by the developer client in which at least one of the plurality of player clients wagers on an outcome of the peer-to-peer competition, wherein at least a part of the wager forms a reward for a winner of the peer-to-peer competition;
- receiving data characterizing a performance of the plurality of player clients in the peer-to-peer competition;
- determining the outcome of the peer-to-peer competition based on the received performance and the third-party game mechanics specified by the developer client; and
- transmitting data to initiated distribution of the reward to the winner based on the outcome.

7. The method of claim 6, wherein the integrations portal prompts the developer client for and receives a push notification certificate; and
wherein the method further comprises:
- receiving data comprising the push notification certificate from the integrations portal;
- generating and transmitting push notifications to the plurality of player clients to present an advertisement on the plurality of player clients.

8. The method of claim 6, wherein the peer-to-peer competition settings enable the wager to include one of a virtual currency wager and a real-money wagering.

9. The method of claim 6, wherein the integrations portal provides to the developer client one or more software development kits for integrating a peer-wagering module into a third-party single player game for execution on a player client, wherein the peer-wagering module receives a wager amount from a player associated with the player client.

10. The method of claim 6, wherein a data warehouse receives one or more metrics from the peer-to-peer wagering platform characterizing player client and peer-to-peer wagering platform interactions; and wherein the integrations portal provides data characterizing the one or more metrics to the developer client for visualization by the developer client.

11. A method for implementation by one or more data processors forming part of at least one computing system, the method comprising:

receiving, from an integrations portal remote from a third party game server providing game data for operation of a game, data that comprises peer-to-peer competition settings and third-party game mechanics, the third-party game mechanics comprising a rule set defining how to determine the outcome of a peer-to-peer competition;

receiving data comprising the game binary executable from the integrations portal;

determining a fingerprint of the game binary executable to uniquely identify the game binary executable;

authorizing a plurality of player-game binary executables executing on respective ones of a plurality of player clients by comparing data characterizing the plurality of player-game binary executables with the fingerprint of the game binary executable to prevent player clients from competing across incongruent versions of the game with different third-party game mechanics;

causing to be provided to the plurality of player clients the peer-to-peer competition according to the peer-to-peer competition settings specified to the integrations portal by a developer client in which at least one of the plurality of player clients wagers on an outcome of the peer-to-peer competition, wherein at least a part of the wager forms a reward for a winner of the peer-to-peer competition; and determining the outcome of the peer-to-peer competition based on the received performance and the third-party game mechanics specified by the developer client.

12. The method of claim 11, wherein the peer-to-peer competition settings enable the wager to include one of a virtual currency wager and a real-money wager.

13. A non-transitory computer program product storing instructions, which when executed by at least one data processor of at least one computing system, implement a method, the method comprising:

receiving, from an integrations portal remote from a third party game server providing game data for operation of a game, data that comprises peer-to-peer competition settings and third-party game mechanics, the third-party game mechanics comprising a rule set defining how to determine the outcome of a peer-to-peer competition;

receiving data comprising the game binary executable from the integrations portal;

determining a fingerprint of the game binary executable to uniquely identify the game binary executable;

authorizing a plurality of player-game binary executables executing on respective ones of a plurality of player clients by comparing data characterizing the plurality of player-game binary executables with the fingerprint of the game binary executable to prevent player clients from competing across incongruent versions of the game with different third-party game mechanics;

causing to be provided to the plurality of player clients the peer-to-peer competition according to the peer-to-peer competition settings specified by a developer client in which at least one of the plurality of player clients wagers on an outcome of the peer-to-peer competition, wherein at least a part of the wager forms a reward for a winner of the peer-to-peer competition; and determining the outcome of the peer-to-peer competition based on the received performance and the third-party game mechanics specified by the developer client.

14. The computer program product of claim 13, wherein the peer-to-peer competition settings enable the wager to include one of a virtual currency wager and a real-money wager.

* * * * *